United States Patent Office 3,394,104
Patented July 23, 1968

3,394,104
POLYOLEFIN COMPOSITIONS STABILIZED
WITH BENZYL UREAS
Bruce W. Hotten, Orinda, Calif., assignor to Chevron
Research Company, a corporation of Delaware
No Drawing. Filed June 17, 1965, Ser. No. 464,843
9 Claims. (Cl. 260—45.9)

ABSTRACT OF THE DISCLOSURE

Composition comprising a normally solid, branched chain polyolefin produced by the polymerization of an alpha mono-olefin of from 3 to 7 carbon atoms and an amount sufficient to inhibit the oxidation of the polyolefin of a benzyl-substituted urea.

---

This application pertains to polyolefin compositions inhibited from oxidation. More specifically it relates to normally solid, branched chain polyolefins containing minor amounts of benzylurea antioxidants.

Polyolefins which are employed as plastics and are molded, extruded, etc., are subject to deterioration by oxidation and by exposure to ultraviolet radiation. Those polyolefins which have a predominantly branched structure are particularly susceptible to oxidative attack. It is thus desirable to provide branched chain polyolefin plastic compositions in which resistance to oxidation is increased. With such materials, objects can be made that will last for long periods without cracking, crazing and discoloration that are the normal results of oxidative attack.

It has now been found that plastic materials highly resistant to oxidation may be compounded from a major portion of a normally solid, branched chain polyolefin and, in an amount sufficient to inhibit oxidation, a benzyl-substituted urea of the formula:

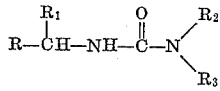

in which R is phenyl or an alkylphenyl radical substituted by alkyl radicals containing from 1 to 30 carbon atoms and having a total of not more than 90 alkyl carbon atoms and $R_1$, $R_2$ and $R_3$ are hydrogen or hydrocarbyl radicals of 1 to 30 carbon atoms.

Thus, the antioxidant materials of this invention are substituted ureas that derive the main of their antioxidant effect from the benzyl grouping attached to at least one of the urea nitrogens. In the prefered materials, R is an alkylphenyl group. $R_1$ may be alkyl or aryl. However, in the preferred materials, $R_1$ is hydrogen, as the hydrogen appears to contribute in some degree to the antioxidant activity of the compound. $R_2$ and $R_3$ may be alkyl, alkylaryl or aryl, etc. However, in a preferred form, one is hydrogen and the other a phenyl or substituted phenyl radical. The end of the molecule on which $R_1$ and $R_2$ are substituted appears to contribute little to the antioxidant effect, but these groups may be varied to adjust the solubility of the additive in the polymer.

It will be found in general that $R_1$ or $R_2$ are preferably aryl, because in preparation of the compound it is usually necessary to employ an isocyanate of the radical, and the alkyl materials are quite toxic while the aryl materials are relatively inert or non-toxic.

Illustrative materials which may be used include benzyl aryl ureas such as 1-benzyl-3-phenylurea, 1-benzyl-3,3-diphenylurea, etc., 1-benzyl-3-alkyl-3-arylureas such as 1-benzyl-3-methyl-3-phenylurea, and 1-benzyl-3-ethyl-3-tolylurea, etc. The phenyl ring of the benzyl group is preferably substituted by alkyl groups which may have up to 30 carbon atoms in each with a total of up to 90 alkyl carbon atoms. Thus, materials may be used such as 1-(4-methyl-3-ethylbenzyl)-3-arylureas. The substitution on the No. 3 nitrogen may also be by a benzyl or substituted benzyl group.

The antioxidant materials are included in the compositions in amounts sufficient to inhibit oxidation of the compositions. Amounts of from 0.01% to 5.0% by weight are preferred.

The benzylureas may be prepared by any suitable method, and the three methods I have employed are indicated by the following reactions:

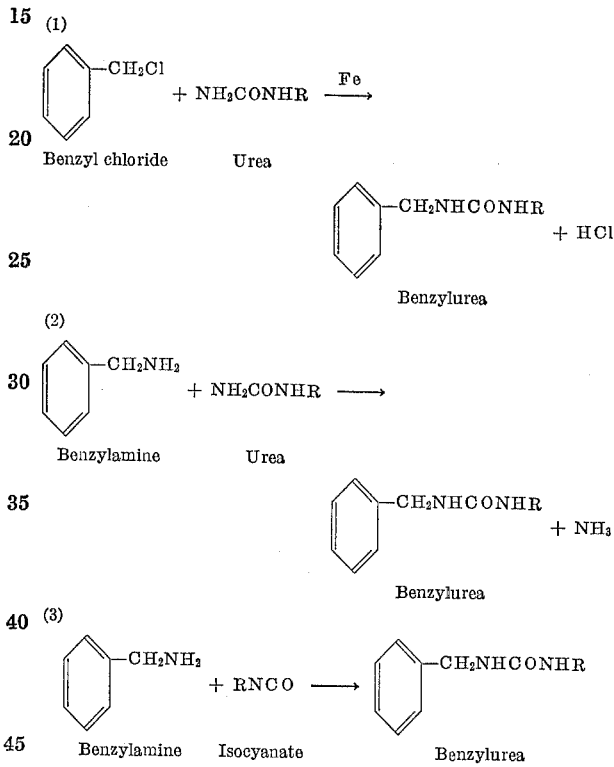

The reaction may ordinarily be carried out at room temperature. However, in some cases the reaction will be hastened by heating the reaction mixture.

The following examples typify the preparation of the benzylureas of this invention:

EXAMPLE I.—REACTION OF BENZYL CHLORIDE WITH ARYLUREA 136 g. (1 mol) of phenylurea, 175 g. (1 mol) of alkylbenzyl chloride (average of 2 methyl and 0.5 ethyl groups per benzene ring) and 3 g. of iron powder were placed in a reaction vessel. The mixture was heated at 130–180° C. with continuous stirring for four hours. The material was then cooled to room temperature and washed with water until it was free of chloride. The yield was 227 g. of a solid material melting over a range of 78–90° C. Percent nitrogen was 7.6% (10% theoretical for 1-(alkylbenzyl)-3-phenylurea).

EXAMPLE II.—REACTION OF ISOCYANATE AND BENZYLAMINE 24 g. (0.2 mol) of phenylisocyanate and 21.0 g. (0.2 mol) of benzylamine were placed in a reaction vessel and stirred for one hour at room temperature. Then the resulting product was dissolved in isopropanol and recrystallized from the solution. The yield was 40 g. of a crystalline solid which melted at 172–175° C. and had a nitrogen content of 12% (12% theoretical for 1-benzyl-3-phenylurea).

In order to demonstrate the effectiveness of the compositions of this invention in resisting oxidation, samples of polypropylene inhibited by benzylureas were subjected to a bomb oxidation test. The test employed was a modified ASTM D–942–50 test. Briefly, this test involves subjecting a 20 g. sample of the polymer to an initial pressure of 110 p.s.i. of oxygen at 200° F. for 100 hours. The pressure is observed until there is a sharp decline and the time to this decline is recorded. The decline indicates a sudden increase in oxidation of the material. The time to the decline is indicated as "Induction Period" and is measured in hours.

The following table shows the results of tests employing polypropylene having a molecular weight of about 500,000 (measured by intrinsic viscosity in decalin at 135° C.). The antioxidant additives were employed at a concentration of 1/10% by weight by dissolving the antioxidant in acetone or other solvent, mulling the solution with the polymer in a mortar, and evaporating the solvent.

TABLE I

| Additive at 0.1% | Induction Period, hr. |
|---|---|
| None | 10.4* |
| —NHCONH— | 42 |
| 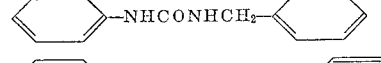—NHCONHCH₂—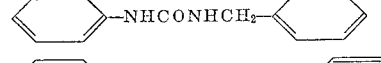 | 770 |
| —NHCONHCH₂CH₂— | 176 |
| —NHCONHCMeH— | 900+ |
| —NHCONHCH₂— R** | 1,500 |
| Same, Purer Prepn | 1,416 |
| —NHCON(CH₂—⟨⟩R**)₂ | 92 |
| Butylhydroxytoluene | 370 |
| Oxanilide | 15 |

*Average of 5 runs; range 9.0–12.5 hr.
**R=average .5 ethyl, 2 ethyl.

As noted from these data, the alkylbenzylurea increases the induction period to over 1500 hours compared with 10.4 hours for the uninhibited material and 370 hours for butylhydroxytoluene, which is the most commonly used inhibitor in polyolefins. Also note that oxanilide, a commonly used metal deactivator, increases the induction period to only 15 hours. Since the 1,1-dibenzyl material increases the induction period to only 92 hours, it is evident that the hydrogen on the nitrogen atom adjacent to the benzyl group is highly important. Also it may be noted that diarylurea, illustrated by diphenylurea, increases the induction period to only 42 hours, showing the great importance of the methylene radical. Tests of alkylbenzyl-substituted di- and tri-ureas prepared from di- and tri-isocyanates gave induction periods of 11 to 62 hours in polypropylene.

Bomb tests employing poly(4-methylpentene-1) having molecular weight of about 600,000 give the following results:

TABLE II

| Additive at 0.1% | Induction Period, hr. |
|---|---|
| None | 9 |
| 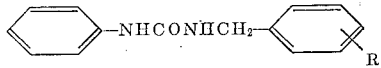 | 447 |

*R=average .5 ethyl, 2 methyl.

These data show that benzylureas are surprisingly effective in inhibiting oxidation of the branched chain polyolefins.

The polyolefins which may be employed in the compositions of this invention include solid polypropylene, polybutenes (including polyisobutene), polymethylpentene, polymethylhexenes, and copolymers of the polyolefins, polyisoprene, etc.

In addition to the benzylurea antioxidants, other additives may also be employed in the compositions. Other materials which may be included are other antioxidants, coloring agents, ultraviolet light absorbants, metal deactivators, etc.

What is claimed is:
1. A composition comprising a major portion of a normally solid, branched chain polyolefin produced by the polymerization of an alpha mono-olefin of from 3 to 7 carbon atoms and in an amount sufficient to inhibit oxidation, a benzyl-substituted urea of the formula

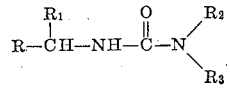

wherein R is a phenyl radical or an alkylphenyl radical substituted by alkyl groups of 1 to 30 carbons and having a total of not more than 90 alkyl carbon atoms and $R_1$, $R_2$ and $R_3$ are hydrogen or alkyl, alkylaryl, aryl or aralkyl radicals of 1 to 30 carbon atoms.

2. The composition of claim 1 wherein R is an alkylphenyl radical substituted by not more than 90 alkyl carbon atoms, $R_1$ is hydrogen or alkyl group of 1 to 10 carbon atoms, and $R_2$ and $R_3$ are aryl or alkaryl radicals.

3. The composition of claim 1 wherein the polyolefin is polypropylene.

4. The composition of claim 1 wherein the polyolefin is polymethyl pentene.

5. The composition of claim 4 wherein the polyolefin is poly-4-methyl pentene.

6. The composition of claim 2 wherein R is an alkylphenyl group substituted by 1 to 3 alkyl groups containing a total of not more than 24 carbon atoms.

7. The composition of claim 6 wherein $R_1$ and $R_2$ are hydrogen and $R_3$ is phenyl.

8. The composition of claim 6 in which $R_1$ and $R_2$ are hydrogen and $R_3$ is benzyl or alkyl substituted benzyl.

9. The composition of claim 6 in which the benzyl-substituted urea is present in the amount of 0.01 to 5.0% by weight.

References Cited

UNITED STATES PATENTS

| 2,477,872 | 8/1949 | Haury | 260—45.9 |
| 2,561,623 | 9/1953 | Hill et al. | 260—45.9 |
| 2,960,488 | 11/1960 | Tamblyn et al. | 260—45.9 |

DONALD E. CZAJA, Primary Examiner.

HOSEA E. TAYLOR, JR., Assistant Examiner.